United States Patent [19]
Glantz

[11] 3,825,042
[45] July 23, 1974

[54] AUXILIARY RESERVOIR FOR FLUID IN A HYDRAULIC BRAKE SYSTEM

[76] Inventor: Hershey Glantz, Miami, Fla.

[22] Filed: Jan. 15, 1973

[21] Appl. No.: 323,758

[52] U.S. Cl.............. 141/95, 137/433, 188/1 R, 222/129, 222/158
[51] Int. Cl............................................. B65b 3/04
[58] Field of Search ...... 141/95; 137/423, 433, 453, 137/454; 184/103 A; 141/9 B, 192, 198; 222/154, 158, 129; 188/1 R

[56] References Cited
UNITED STATES PATENTS
1,542,912   6/1925   Rockwell .................... 184/103 A Primary Examiner—Houston S. Bell, Jr.
Attorney, Agent, or Firm—Lloyd J. Andres

[57] ABSTRACT

This invention automatically provides auxiliary fluid for vehicle brake systems by the provision of a reservoir for retaining one or more chambers for feeding corresponding hydraulic circuits and thus preventing accidental loss of braking power and the resulting accidents. The fluid from the reservoir is automatically fed to the brake actuating assembly by a float means and the reservoir made of transparent material to provide visual inspection for indicating refill.

4 Claims, 7 Drawing Figures

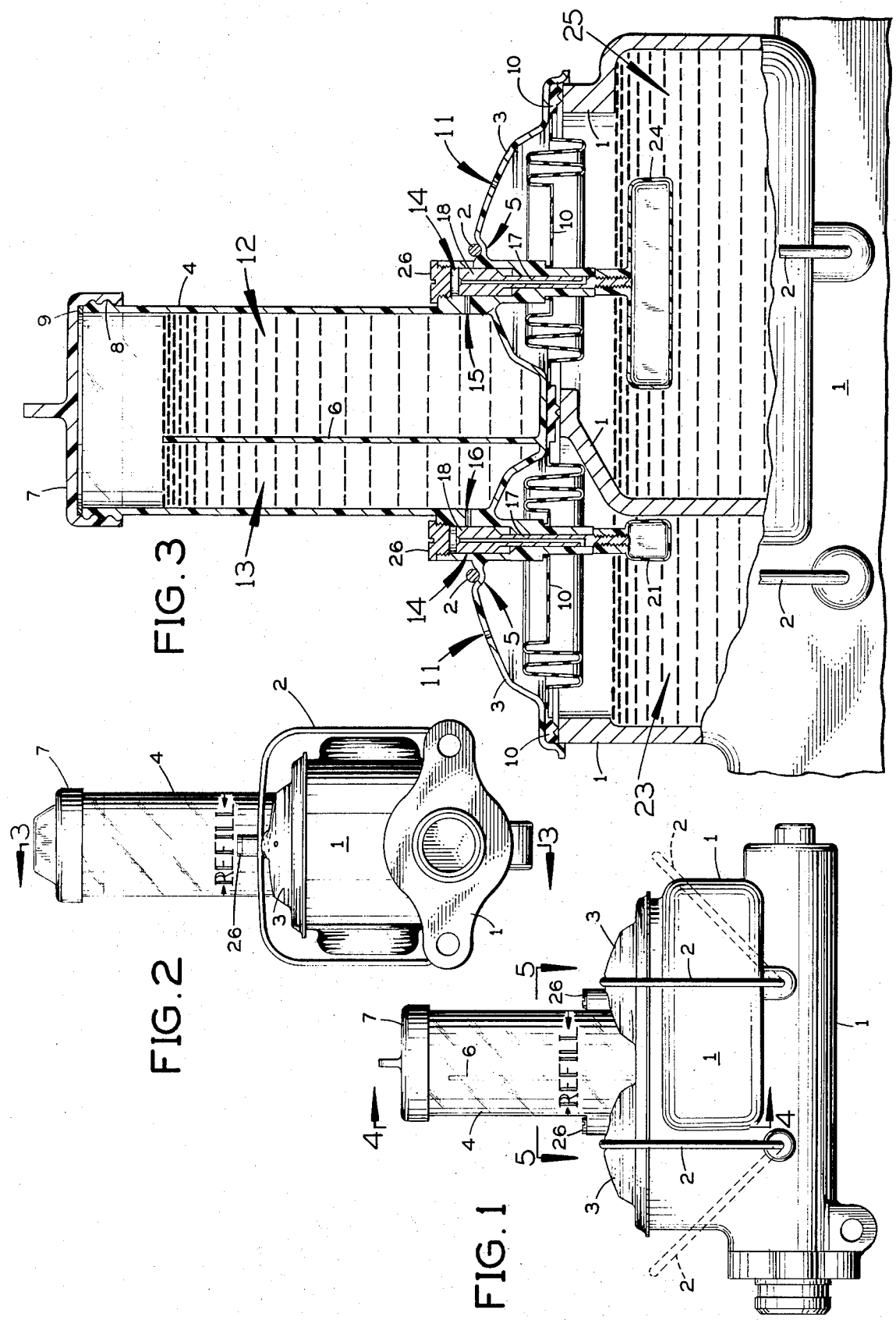

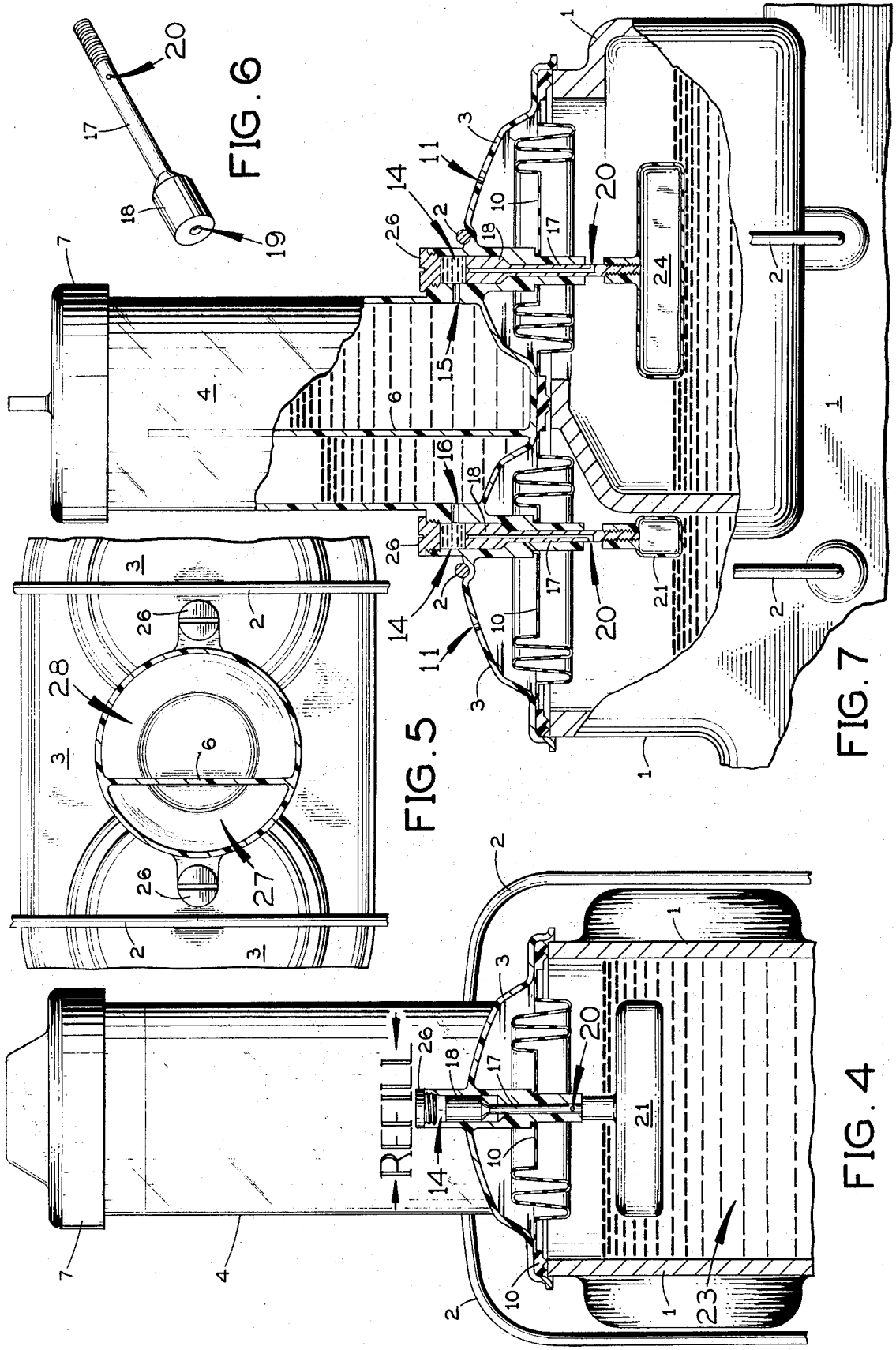

3,825,042

AUXILIARY RESERVOIR FOR FLUID IN A HYDRAULIC BRAKE SYSTEM

SPECIFICATION

This invention relates in general to hydraulic systems for vehicles and more particularly to an attachment for master actuating chambers for providing a reservoir for automatically feeding fluid to the hydraulic system.

Since the fluid in one or more independent hydraulic brake systems may develop unknown leaks, the brakes related thereto may fail at a critical time and may result in serious accidents.

The above objections and disadvantages are substantially eliminated by the provision of a readily visible means for observing the level of the hydraulic fluid at a glance at a simple "warning" on the side of the reservoir.

The embodiment illustrated and hereinafter described represents a replacement for the opaque simple cover commonly used on the master cylinder in motor cars, in which front and rear wheels are controlled by independent hydraulic systems.

Another object of the invention is the provision of a reservoir having two chambers for independently supplying a make-up fluid corresponding to two independent hydraulic systems.

A further object of the invention provides a dual reservoir made from transparent material to indicate the level of fluid therein, which level is controlled by an independent float for independently indicating the need for replenishing the fluid in each of the two systems.

A further object of the invention is the provision of an auxiliary reservoir assembly which is mechanically interchangeable with the present opaque covers on certain master cylinder assemblies.

These and other objects and advantages in one embodiment of the invention are described and shown in the following specification and drawing, in which:

FIG. 1 is a side elevation in reduced scale of a typical master cylinder with the reservoir assembly replacing the normal cover thereof.

FIG. 2 is a front elevation of the device shown in FIG. 1.

FIG. 3 is an enlarged cross sectional view taken through section line 3—3, FIG. 2, with the hydraulic fluid at proper level within the master cylinder brake chamber.

FIG. 4 is an enlarged cross sectional end elevation taken through section line 4—4, FIG. 1.

FIG. 5 is an enlarged cross sectional top plan view taken through section line 5—5, FIG. 1.

FIG. 6 is a perspective view of the slidable valve core separately responsive to each float for controlling the addition of fluid to the hydraulic fluid.

FIG. 7 illustrates the valve core independently moved by the floats to provide an open passageway for an open channel for the flow of fluid from the chambers in the master cylinder reservoir.

Referring to FIGS. 1, 2, and 3, a well known master cylinder assembly 1 is normally supplied with a stamped metal original cover without an auxiliary reservoir of any form, which cover is retained on the open top of the master cylinder assembly by U-shaped spring levers 2 which are pivotally secured to assembly 1 and manually movable to the dotted positions shown in FIG. 1 for removal thereof when additional fluid is required in the master cylinder chamber.

The replacement cover 3 and the reservoir 4 are preferably made from molded plastic material, such as one of the methacrylates or the equivalent, with corresponding notches 5, better shown in FIG. 3.

Referring to FIG. 2, the combination auxiliary reservoir and gauge 4 is generally cylindrical in shape and has a partition 6 therein, better shown in FIG. 3. The upper end of the auxiliary reservoir terminates in a closure cap 7 which is threaded on mating threads 8 on the upper end of the reservoir with a sealing washer 9 for sealing the closure. The original accordion type gasket 10 provides an resilient hermetic seal for the cover for the chamber in the entire assembly 1 and remains in sealed replacement position with the cover 3, which cover is provided with a pair of small vents 11 which provide free movement of the gasket 10 in the dome portion of cover 3.

Since the front and rear wheels of a vehicle differ in braking effort, the reservoir provides for corresponding volume of capacity 12 and 13, respectively, in most cases. Each space capacity 12 and 13 have separate valve systems for providing for a small dual-diameter cylinder bore 14 secured to the cover 3 and having an exit passageway 15 and 16, respectively, with each in the form of a bore of predetermined diameter.

FIG. 3 shows in cross section a cylindrical valve pin 17 slidably fitted in each bore on opposite sides of the reservoir 4, which is fed through passageways 15-16 into each of the bores 14, respectively.

FIG. 6 illustrates a valve pin 17 which is coaxial with a larger diameter portion 18 at the upper end thereof and a coaxial bore 19 from the center of the portion 18 to an outlet hole 20.

FIG. 3 also illustrates a smaller float 21 threaded onto the lower end of pin 17 which float is responsive to the level of fluid 22 in the smaller chamber 23 in the casing of the assembly 1. A second larger float 24 is threaded onto the lower end of the pin 17, as shown, and is responsive to the fluid in the larger chamber 25.

FIGS. 3 and 4 also show two screw caps 26 for closing the upper ends of both bores 14.

FIG. 5 illustrates the cover 3 when held in closed position by levers 2—2 and also indicates the small and large portions 27 and 28, respectively, which is divided by an integral partition 6.

Under the assumption that both portions of the reservoir 4 are filled with hydraulic fluid and the casing of the assembly 1 has sufficient fluid therein for normal operation, then the supply of fluid to both hydraulic systems is proper, which is illustrated in FIG. 3. When either of the capacities 12 or 13 in the reservoir become depleted to or near the refill line on the reservoir, then the valve pin 17 will have descended by the action of the floats 21 and 24 to a position where fluid from each portion of the reservoir will flow through passageways 15 and 16 and downward through the coaxial bore 19 in pin 17 and flow from the transverse outlet thereof and refill the chamber of the assembly 1 and raise the floats 21 or 24 dependent upon the portion of the reservoir also depleted to its normal position, shown in FIG. 3, which automatically provides for the valve portion of pin 17 to cut off the flow of fluid from the exit passageways 15 or 16 until the level in the chamber of the assembly 1 has lowered to a predetermined level, at which time the cycle will be repeated so long as fluid remains in the reservoir 4.

The reservoir 4 is closed with a screw cap 7 and sealed on the upper edge of the reservoir by a resilient washer or disc 9. There are also vents 11—11 in the cover 3 which permits air to flow therethrough when the corrugated gasket 10—10 fluctuates under sudden changes of level in each hydraulic system.

It is to be noted that the combination of the auxiliary fluid chamber provides extra fluid for extending the normal fluid addition periods as well as selectively indicating whether the front or rear brake systems have excessive leakage, thus conserving service inspection time.

It is to be noted that the auxiliary reservoir only may be made of transparent plastic material whereas the cover 3 may be formed of die cast metal with the auxiliary reservoir secured and sealed to the cover 3.

It is to be understood that certain modifications in construction are intended to come within the teachings and scope of the above specification.

Having described my invention, I claim:

1. A combination auxiliary two chamber reservoir and fluid gauge including a filler cap adapted and constructed to provide a sealed cover means on two main chamber reservoirs of a dual hydraulic system which provides independent hydraulic oil pressure to front and rear brakes of an automotive vehicle comprising a sealed transparent plastic cover means having the margin thereof independently sealed around the upper edge of each said main chamber reservoir, a transparent plastic auxiliary reservoir formed integral with said cover means and extending a predetermined distance upward normal to said cover means and including a partition therein forming a first and second independent chamber in said auxiliary reservoir, a manual removable filler cap for opening and closing and sealing the upper end of said auxiliary reservoir, a passageway connecting each said first and second chamber in said auxiliary reservoir with each first and second chamber in said main reservoir respectively, a float valve means in said cover means for independently controlling the flow of hydraulic fluid in each of said passageways when operated, each of said valve means operated by a float in each said first and second main chamber whereby said float in each said main chamber normally holds corresponding said valve means closed for preventing the flow of said fluid into each said chamber in said main reservoir and whereby the lowering of the level of said fluid in each said first and second chamber in said main reservoir will lower said float and open a corresponding said valve means and permit said fluid to flow through a corresponding said passageway from a corresponding chamber in said auxiliary reservoir into a corresponding chamber in said main reservoir with the level of the fluid in said chamber of the auxiliary reservoir visible in each said chamber of said auxiliary reservoir for visibly gauging the fluid requirements in each said chamber of the said auxiliary reservoir and viewing the degree of dissipation of fluid in each branch of the said dual hydraulic system.

2. The construction recited in claim 1 wherein the said partition in said auxiliary reservoir is positioned off center a predetermined distance to provide two chambers of different fluid capacity corresponding with the differences in the said dual distribution system.

3. The construction recited in claim 1 wherein the said cover means is a formed metal stamping and said auxiliary reservoir has the bottom end thereof secured and sealed to an opening in said cover means.

4. The construction recited in claim 1 wherein a transverse danger line is positioned on the lower portion of said auxiliary reservoir indicating the relative heights of the two columns of fluid and the level where new fluid must be added for assuring the safe operation of said hydraulic system.

* * * * *